N. B. FORREST.
Car Brake.
No. 56,030.  Patented July 3, 1866.
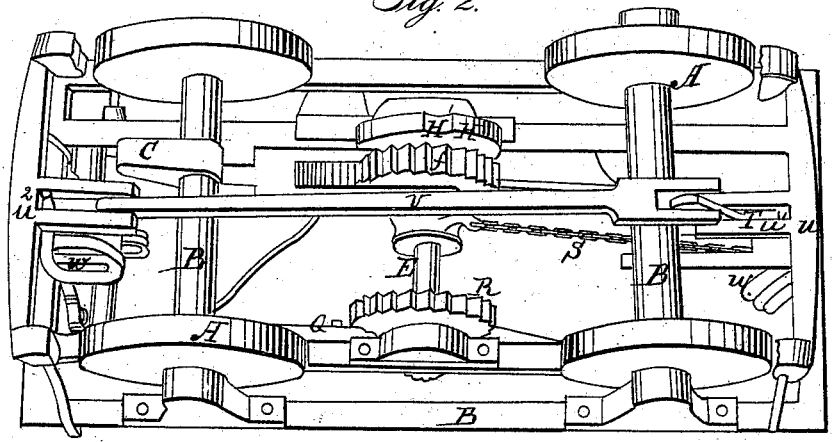
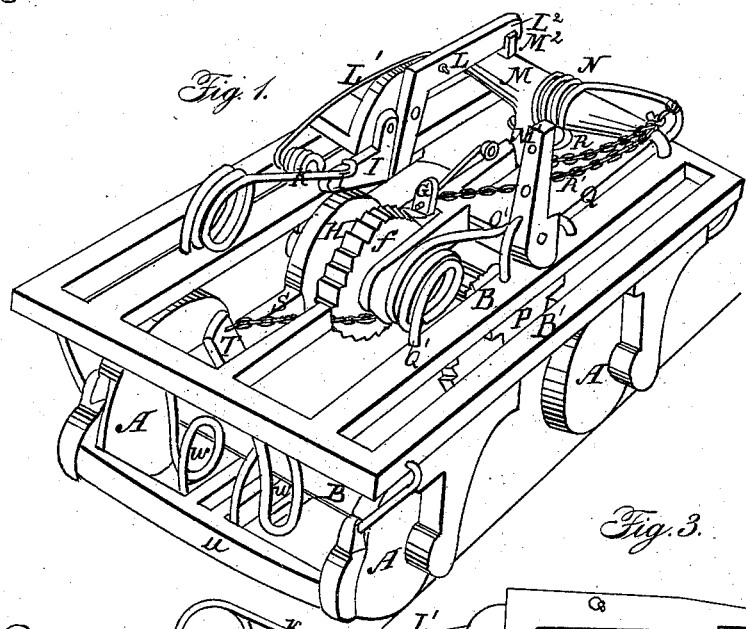
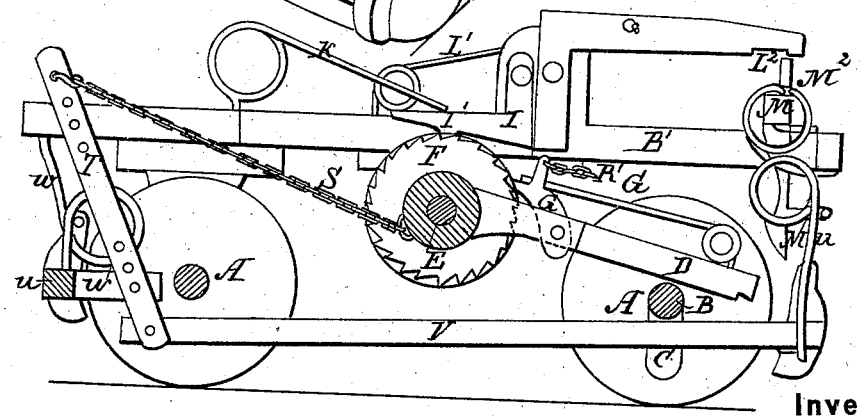
Witnesses:
J. J. Connolly
L. A. Murphy
Inventor:
N. B. Forrest
by D. P. Holloway & Co.
his attys.

UNITED STATES PATENT OFFICE.

NELSON B. FORREST, OF AUBURN, NEW YORK.

IMPROVED CAR-BRAKE.

Specification forming part of Letters Patent No. 56,030, dated July 3, 1866.

*To all whom it may concern:*

Be it known that I, NELSON B. FORREST, of Auburn, in the county of Cayuga and State of New York, have invented a new and useful Improvement in the Mode of Applying the Brakes to Railroad-Car Wheels; and I do hereby declare that the following is a full, clear, and exact description of the same, reference being had to the annexed drawings, made part of this specification, in which—

Figure 1 is a perspective view of a car-truck with my brake attached. Fig. 2 is a view of the same turned bottom side up, and Fig. 3 is a central vertical longitudinal section.

The same letters refer to identical parts.

A A are the car-wheels, attached in the ordinary manner to the rigid axle B, which is attached to the ordinary railway-truck B'. On one of the axles is permanently attached the cam C, rounded upon its point. This cam, with the revolution of the axle, strikes against the lower side of the lever D when the same is let down, as hereinafter explained. This lever is bifurcated and attached to, but playing freely upon, the shaft of the capstan E. On this shaft is keyed the ratchet-wheel T between the bifurcations of the lever D. The pawl G, similarly attached to the lever by a pivot on which it plays freely, works against the teeth of this ratchet, so as to cause a part rotation of the capstan with every motion upward of the lever D. On the opposite end of the capstan-shaft is another ratchet-wheel, P, on the face of which works a pawl, Q, pivoted to the truck-frame and held in place by the coiled spring Q'. The point of the pawl Q is turned upward and pivoted to the eccentric-lever O, which rests upon the frame of the truck, and is so shaped that by pulling the chain R the pawl will be lifted from the ratchet B. A similar chain, R', attached to the pawl G, will disengage this from the ratchet F. These chains are so regulated that a rope attached to a ring through the two will disengage simultaneously both pawls.

To the capstan E is attached a chain, S, attached to a lever, T, by either of a series of holes. This lever T has for a movable fulcrum the lugs U' of the brake-bar U, and its short end is attached to the connecting-rod V, which passes under both axles and is fastened to similar lugs on the middle of the brake-bar $U^2$ of the opposite pair of wheels. Coiled springs W, attached to the truck and resting against the brake-bar, keep the brakes away from the wheel when running freely.

The end of the lever D is sustained upon the hook M' when the brakes are not intended to be applied, and is thus retained out of reach of the cam C, which plays freely below it. This hook depends from the hinged axle M, which rests upon the truck-frame. A rope attached to the back part of this hook enables the brakeman to drop the end of the lever upon the cam, and by its exactness, as explained, bring down the brakes. A single rope and one man may thus apply at the same instant all the brakes under a train of cars, which may in like manner be released by another rope attached to the chains R and R'. The coiled spring N, attached to the axle M, keeps the hook in place to sustain the lever D when not drawn away by the brakeman, as described.

From the top of the axle M projects a short lever, $M^2$, by which the hook M' may be held out of reach of the lever D by means of a notch in the lever L, which acts automatically, as I will describe.

On the outer end of the capstan-shaft is attached the pulley H, which revolves with the shaft E. In the face of this pulley are one or more depressions, H'. There should be two of these; but more may be used if desired. An L-shaped lever, I, is pivoted by its short leg to a lug on the truck-frame, and its long leg lies nearly horizontally on the face of the pulley H, resting on the point I' and pressed downward by the spring K. Another L-shaped lever, L, is in like manner pivoted to the same lug by a point attached at or in the short leg near the elbow. This lever is reversed in position as compared with lever I, and its short leg rests against the base of the short leg of lever I. A spring, L', attached to the long leg of this lever, presses N down. Near the end of the lug is the notch $L^2$, already described as retaining the arm $M^2$.

When the hooked lever M' is drawn away by the brakeman the lever L, by the tension of the spring L', takes the arm $M^2$ and retains it, thus keeping the hook M' away from the lever D without the aid of the brakeman, who immediately relaxes the rope. As the capstan revolves with the action of the lever operated by the cam C the brakes are brought down upon the wheels until at the point of ordinary light tension applied in stopping the train the point I drops into the depression H′, which is properly located for the purpose. This presses the heel of the lever I against the point of the short leg of the lever L, and forcing that back raises the long leg, and disengaging the arm M², by force of the spring N, the hook drops, and catching the lever D retains it out of reach of the cam C.

If it is desired to increase the tension of the brakes the brakeman again disengages the hook, when the same operation is repeated with an increased action of the lever until another depression in the pulley H again, through the same means, stops the action of the lever D. By this means the danger of breaking the chains or other parts of the mechanism is avoided.

Having fully explained the construction and mode of operating my improved automatic brake, what I claim as my invention, and seek to secure by Letters Patent, is—

1. The cam C, placed on the axle of a railway-car for the purpose of actuating automatically a brake, substantially in the manner set forth.

2. The device for automatically stopping and releasing the hook M′ by means of a pulley, H, and levers I and L, constructed and arranged substantially as set forth.

In testimony whereof I have signed my name to this specification in the presence of two subscribing witnesses.

NELSON B. FORREST.

Witnesses:
 URIAH N. PEARSON,
 IMLEY A. BARNES.